Jan. 27, 1959   H. GOLD ET AL   2,870,777
FLUID METERING SYSTEM
Original Filed March 14, 1947   3 Sheets-Sheet 1

Inventors
HAROLD GOLD
DAVID M. STRAIGHT
By R. J. Tompkins
Attorney

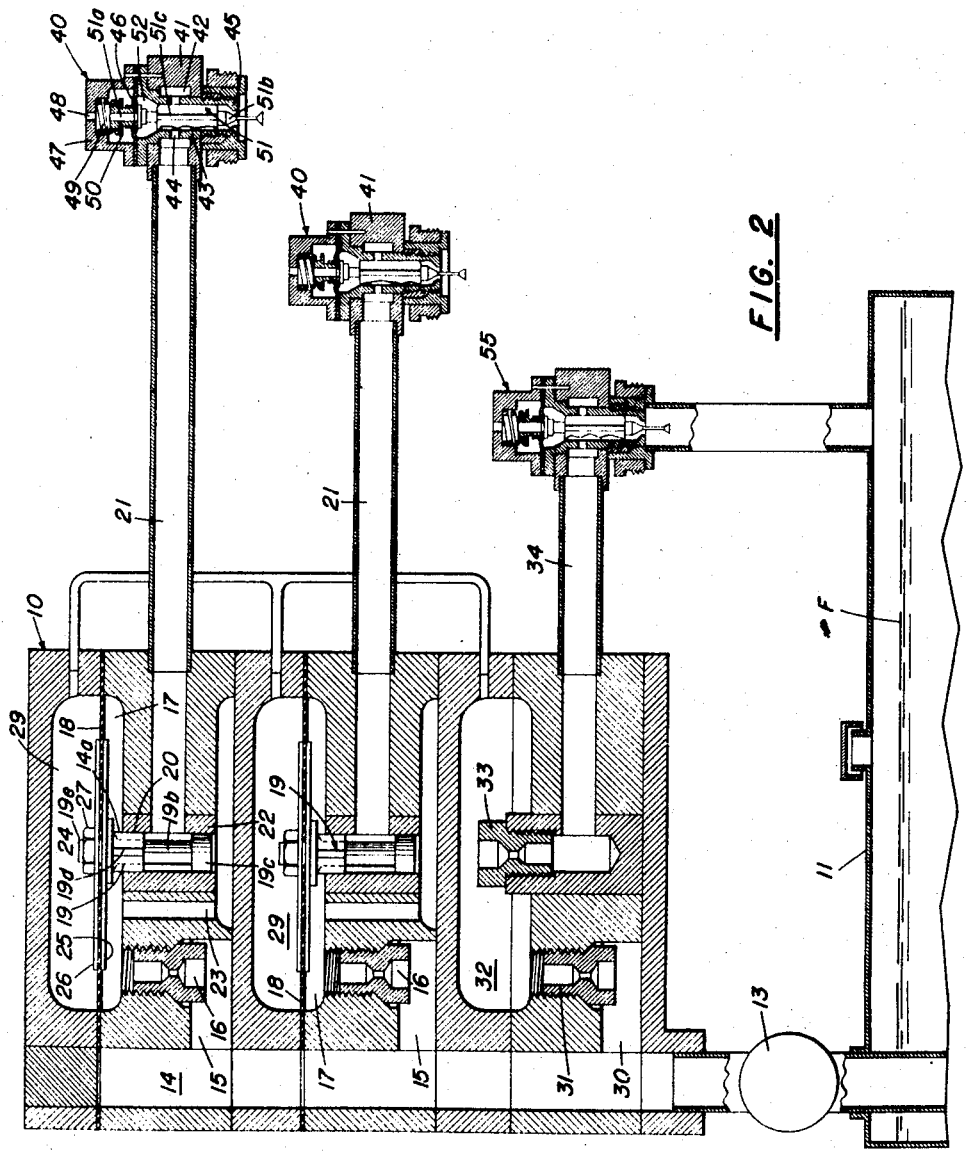

Jan. 27, 1959

H. GOLD ET AL 2,870,777

FLUID METERING SYSTEM

Original Filed March 14, 1947

Inventor
HAROLD GOLD
DAVID M. STRAIGHT

By R. S. Tompkins

Attorney

United States Patent Office 2,870,777
Patented Jan. 27, 1959

2,870,777

FLUID METERING SYSTEM

Harold Gold, Shaker Heights, and David M. Straight, North Olmsted, Ohio

Application July 3, 1956, Serial No. 595,803

3 Claims. (Cl. 137—100)

(Granted under Title 35, U. S. Code (1952), sec. 266)

The invention described herein may be manufactured and used by or for the Government of the United States of America for governmental purposes without the payment of any royalties thereon or therefor.

This application is a division of our copending application Serial No. 734,840, filed March 14, 1947, now Patent 2,809,653, dated October 15, 1957.

This invention deals generally with the metering of fluids to or from a plurality of flow passages.

Specifically, the invention relates to devices for uniformly proportioning flow of fluid such as liquid fuel from a common source to a plurality of outlets, or from a plurality of sources to a common outlet, irrespective of differences in discharge pressures of the outlets or sources, or variations in fluid flow rates.

The invention will hereinafter be specifically described as embodied in devices for controlling fuel distribution in gas turbine engines, or for regulating flow from a plurality of fuel tanks so that all of the tanks empty at the same rate. However, it should be understood that the invention is not limited to the illustrated uses or embodiments, being generally applicable for the automatic control of fluid flow.

In gas turbine engines, fuel is pumped from a source into a manifold from which it flows to various atomizing nozzles to be discharged into a combustion chamber. The flow rate from the manifold to each nozzle is controlled by the nozzle, but the requirements for a well-atomized discharge renders very difficult the matching of the nozzles for equal flow distribution. Further, the malfunctioning of one of the nozzles will greatly disturb the flow rates to the remaining nozzles. A device to automatically control the rate of flow of fuel in each branch conduit from the manifold to the separate nozzles in such a maner that fuel flow is rendered independent of discharge nozzle variations is highly desirable. The present invention provides such a device which operates by automatically controlling the static pressure drop across matched metering orifices located in each branch conduit.

In the feeding of fuel from a plurality of tanks in an aircraft to the aircraft engine, it is highly desirable that each of the tanks empty at the same rate so that load conditions in the airplane will be balanced. The control devices of the present invention also function to so balance the flow rate from a plurality of tanks that the tanks will empty at the same rate.

An object of the invention is to provide a device which will control the distribution of fuel to any number of discharge nozzles in a gas turbine engine or the like.

Another object of the invention is to provide a device which will maintain predetermined perfect distribution of fuel from a single source to a plurality of nozzles irrespective of uneven discharge nozzle pressure and variations in fuel flow rates.

Another object of the invention is to divide a supply of fluid into a plurality of parts maintained in constant relationship by flowing each divided fluid stream through a separate orifice and automatically throttling the streams in accordance with variations in pressure drops across the orifices.

A still further object of the invention is to provide a method of dividing a supply of fluid into a plurality of equal or predetermined proportioned parts by flowing the fluid along a plurality of separate paths and through a separate orifice in each path having a predetermined resistance to fluid flow and automatically throttling the flow in each path in accordance with variations in pressure drops across the orifices from predetermined variations.

Another object of the invention is to provide fluid flow control devices which flow fluid streams through separate orifices and automatically throttle the streams in accordance with variations in pressure drops across the orifices to nullify said variations and maintain equal flow in all streams.

A specific object of the invention is to provide a fuel intake manifold arrangement for a plurality of discharge nozzles in a gas turbine engine with a separate orificed flow path between each nozzle and the source of supply, and with a diaphragm-controlled metering valve actuated by departure from equality of the pressure drops across any of the orifices to nullify said departure and maintain constant flow rates in all of said paths irrespective of nozzle discharge pressures and malfunctioning of the nozzles.

A still further object of the invention is to provide a pilot regulator for a fluid distribution system wherein fixed orifices in series in a flow path of the device determine the pressure on an actuator for throttle valves controlling flow in other paths of the device and thereby maintain constant flow rates in said paths irrespective of variations in pressures of said fluid fed to the orifices.

Another and important object of this invention is to maintain a predetermined distribution relationship of volumetric flow rates in separate conduits throughout a wide range of flow conditions.

Another important specific object of the invention is to maintain a constant flow relationship in a plurality of branch conduits throughout a wide range of flow rates so that fuel nozzles in a gas turbine engine will discharge identical amounts of fuel throughout a wide range of fuel flow.

Other and further objects of this invention will be apparent from the following detailed descriptions of the annexed sheets of drawings which diagrammatically illustrate various embodiments of the invention as examples of devices within the scope of the invention.

On the drawings:

Figure 2 is a diagrammatic view similar to Figure 1 but illustrating distribution of fuel to a plurality of spring-loaded diaphragm nozzles or jets for a gas turbine engine.

Figure 5 is a view of the system of Figure 4 arranged for equally emptying a plurality of tanks to maintain balanced fuel load distribution in an airplane or the like.

As shown on the drawings:

Figure 1:
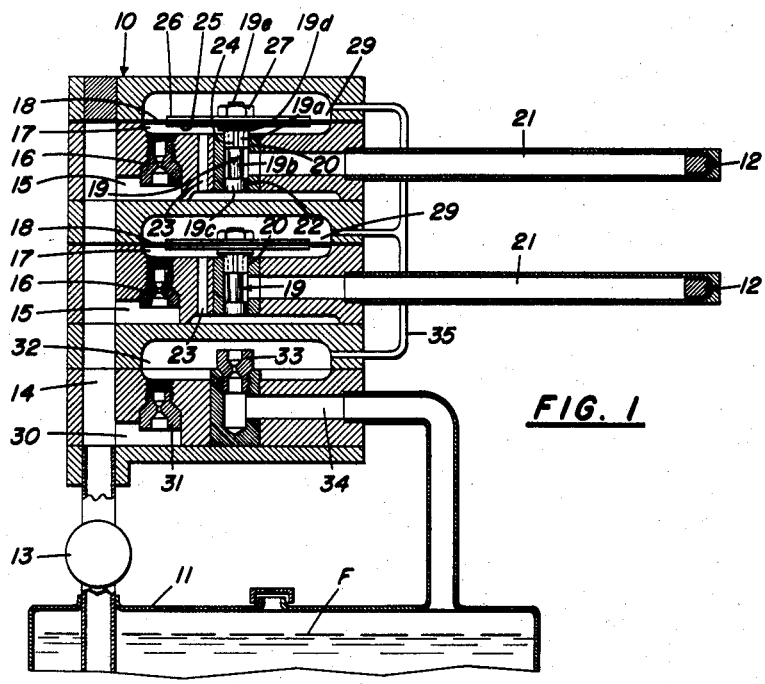
Figure 1 is a diagrammatic elevational view with parts in vertical cross section illustrating one system according to this invention for uniformly distributing fuel to a plurality of fixed orifice jets for a gas turbine engine.

In Figure 1, the reference numeral 10 designates generally control apparatus for equally distributing liquid fuel F from a supply tank 11 to a plurality of fixed orifice jets or nozzles 12, 12. These nozzles supply the fuel to the combustion chamber of a gas turbine engine (not shown) and it is important that the combustion chamber receives identical amounts of fuel from each nozzle throughout a wide range of fuel flow.

A pump 13 pressures fuel from the tank 11 into a manifold passage 14 of the apparatus 10 from which the fluid flows through a plurality of distributing passages 15 (one for each nozzle) and thence through a metering jet 16 in each passage 15 to a chamber 17 bounded on one side by a limp diaphragm 18 carrying a valve plug 19 which controls flow through an orifice 20 to a passage 21 extending to the nozzle 12. The valve plug 19 has a slotted or grooved cylindrical end 19a snugly slidable in the orifice 20 and connected through a rod portion 19b with a second cylindrical portion 19c snugly slidable in a seat 22. A passageway 23 connects the chamber 17 with the bottom face of the cylindrical portion 19c whereby the static fuel pressure in chamber 17 is caused to act on the entire area of the diaphragm 18. The areas of the cylindrical portions 19a and 19c, exposed to the passageway 21, are equal so that the forces resulting from static fuel pressure in the passageway 21 are balanced. The cylindrical portion 19a has grooves or slots 24 extending longitudinally thereof at spaced intervals around its periphery, and these grooves are closed at their upper ends by a head 19d on the top of the cylindrical portion. The lower ends of the grooves communicate through the bottom of the cylindrical portion to discharge into the passageway 21. The grooves 24 provide metering passages through the orifice 20 and the flow rate through the orifice is determined by the proportion of the upper ends of the grooves that is exposed to the chamber 17. A washer 25 is bottomed on the head 19d of the plug and underlies the central portion of the diaphragm 18. A second washer 26 overlies the diaphragm 18 and a nut 27 threaded on the threaded upper end 19e of the plug clamps the washers 25 and 26 on the diaphragm and anchors the plug valve to the diaphragm.

A chamber 29 is provided above each diaphragm 18 and is separated from the chamber 17 by the diaphragm.

A pilot branch passage 30 also extends from the manifold passage 14 and contains a pilot orifice 31 which discharges into a chamber 32. The chamber 32, in turn, discharges through a jet orifice 33 into a passageway 34 communicating with the fuel tank 11.

The chamber 32 is connected through a passage 35 with each chamber 29. Thus the static fuel pressures in each chamber 29 are at all times equal to the static fuel pressure in chamber 32. The diaphragms 18 acted on by the fuel pressure in chambers 29 position the valve plugs 19 until the static pressure in each chamber 17 is equal to the static pressure in chamber 32. Any change in resistance to fluid flow in any of the discharge passages 21 will be transmitted back as a change in pressure in the chamber 17 which feeds the particular passage 21. This change in pressure causes the diaphragm 18 to alter the position of the plug valve 19 varying the free area through the slots 24 thereof until the pressure balance between the chamber 17 and the chamber 32 is restored. The static pressures on the downstream side of each metering jet 16 are therefore maintained equal. Since the manifold passage 14 is relatively large, the effect of fluid friction is negligible and all of the branch metering jets 16 receive the fuel at the same static pressure. The static pressure drops across each metering jet 16 are therefore maintained equal, independently of differences in resistance to fluid flow of any of the passages 21 or jet nozzles 12.

When it is desired to maintain equal rates of flow in each passage 21, as in the application of this system to a multi-jet gas-turbine engine, the branch metering jets 16 are provided with equal orifices. In other applications where it may be desired to maintain a definite ratio, other than unity, between the rates of flow in each passage 21, it is only necessary to use branch metering jets 16 which have orifices sized for giving the desired flow ratio.

The ratio of rate of flow through the passage 34 back to the tank 11 to the rate of flow in any of the passages 21 to the nozzle 12 is maintained at a constant ratio which is determined by the ratio of the orifice areas of the pilot-metering jet 31 to the branch metering jets 16. The passage 34 therefore could, if desired, be used to supply another jet nozzle 12. In the application of this system to the gas turbine engine, it is preferable, however, to return the flow from passage 34 to the fuel tank 11.

The pressure in pilot regulator chamber 32 must be maintained higher than the pressure in any of the passages 21 and therefore the range of operation of the system of Figure 1 is limited by the ability of the pilot regulator jet 33 to maintain this higher pressure in the chamber 32.

Since the nozzles 12 in the system of Figure 1 have fixed orifices, a fixed pilot regulator jet 33 will be sufficient to maintain a pressure in the chamber 32 greater than the pressures in the passages 21. However, if fixed jet nozzles are replaced with spring-loaded diaphragm-operated nozzles which do not discharge until a predetermined pressure is built up against their diaphragms and which then discharge at a constantly increasing flow rate as pressure increases, it is necessary to supplement the pilot regulating jet 33 with a spring-loaded diaphragm-operated device similar to the nozzle.

A system according to this invention for use with spring-loaded diaphragm-operated nozzles 40 is shown in Figure 2, wherein parts identical with parts described in Figure 1 have been marked with the same reference numerals.

In the system of Figure 2, the conduits defining the passages 21 receive nozzle housings 41 on their outer ends. These housings are centrally apertured and have annular chambers 42 communicating with the passages 21. A tubular body 43 projects through each housing 41 and has ports 44 in its side wall communicating with the annular passage 42. The bottom end of the tubular member 43 has a valve seat 45 thereon, while the upper end of the member is closed by a diaphragm 46. A cap 47 clamps the diaphragm on the member 43. The cap is vented to the atmosphere as at 48 and bottoms a coil spring 49 which acts on an adjustable nut 50 on a stem 51a of a valve member 51. The stem 51a projects through the central portion of the diaphragm 46. The valve member 51 slides in the body 43 and has a needle-like bottom end 51b coacting with the seat 45 to close the nozzle. The main body of the valve has grooves 51c along the length thereof for feeding fuel from the ports 44 to the valve seat 45 as well as to a chamber 52 closed by the diaphragm 46. The spring 49 loads the valve member 51 so that it will remain on its seat 45 until a predetermined pressure has been built up in the diaphragm chamber 52, whereupon the diaphragm will be forced upwardly to lift the valve off its seat 45 and open the metering passages 51c for discharge.

Since the nozzle 40 will not open until a predetermined pressure has been built up in the passages 21, and since the flow rate of discharge through the nozzle will then increase in direct proportion to the increase in pressures in the passages 21, the pilot regulator jet 33 alone may not be sufficient to maintain a pressure in chamber 32 which is higher than pressures in the passages 21, and therefore a spring-loaded diaphragm-operated metering valve 55 is provided in the discharge passage 34 between the pilot regulator jet and the tank 11. This valve 55 can be identical with the nozzles 40 and is so shown. The valve 55 will coact with the pilot regulator jet 33 to hold a sufficient back pressure in the chamber 32 that is always greater than the pressures in the passages 21. Therefore, even at low flow rates, the pressure in chamber 32 will be higher than pressures in the passages 21.

The system of Figure 2 operates in the same manner as that described above in connection with Figure 1, and the pump 13 can be run at variable speeds throughout a relatively wide range for varying flow rates and the jets and throttle valves 19 will equally distribute the fluid to all of the passages 21 irrespective of the changes in flow rates as determined by the pump 13.

Figure 3:
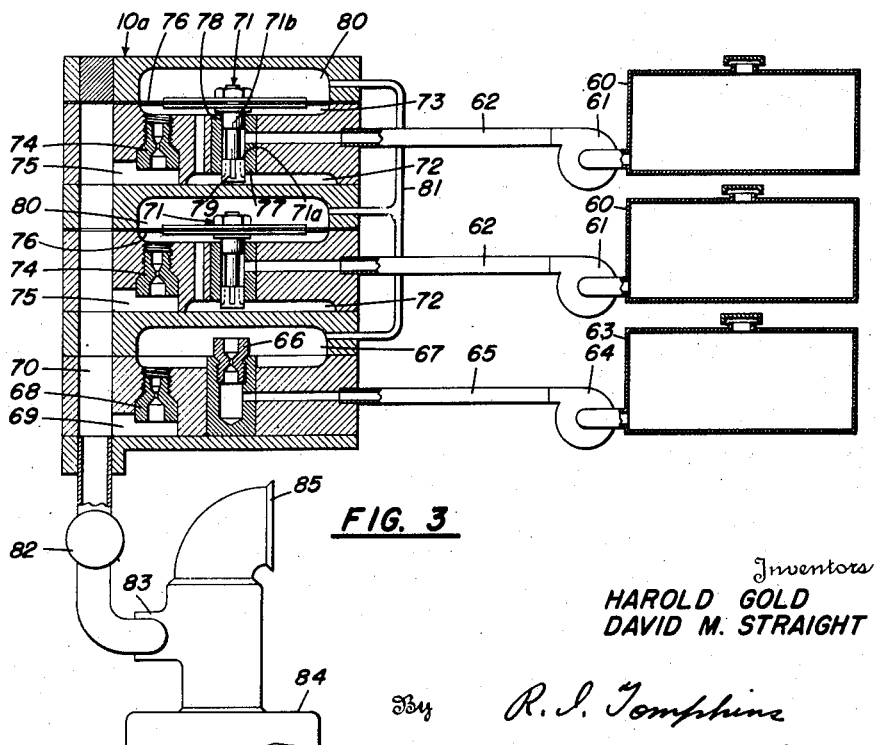
Figure 3 is a diagrammatic elevational view, with parts in vertical cross section, illustrating a distribution system according to this invention for uniformly emptying a plurality of fuel tanks to supply fuel to the carburetor of an aircraft engine so that equal balancing of the fuel load in the airplane will be maintained.

In the embodiment shown in Figure 3 the apparatus 10a is arranged to control the flow from a plurality of sources to a single outlet so that tanks or the like will be emptied at the same rate to maintain balanced load conditions on an airplane or the like.

In Figure 3 a plurality of fuel tanks 60 are each equipped with a centrifugal-type booster pump 61 discharging into passages 62. Another tank 63 has a separate booster pump 64 discharging into a passage 65. The tank 63 may be considered the pilot tank, and the other tanks 60 are caused to discharge at the same rate as this pilot tank.

The passage 65 has a fixed metering jet 66 therein discharging into a chamber 67 of the apparatus 10a, and this chamber 67 discharges through a pilot-regulating jet 68 into a branch passage 69 which, in turn, empties into a manifold passage 70.

The passages 62 each discharge through a throttle valve 71 into a passage 72 communicating with a chamber 73 which chamber, in turn, discharges through a fixed metering jet 74 and branch passageway 75 into a manifold passage 70. The chamber 73 is bounded on one side by a limp diaphragm 76 which, as explained hereinabove, is connected to the throttle valve 71 by washers and the like. The throttle valve 71 has cylindrical portions 71a and 71b respectively slidably seated in an orifice 77 and a passage 78. The cylindrical portion 71a has slots 79 metering flow from the passage 62 to the passage 72 in amounts determined by the extent of exposure of the ends of the slots to the passage 72. The valves 71 are balanced in the same manner as the valves 19 described in the other embodiments of the invention.

A chamber 80 is provided above each diaphragm 76 and each chamber 80 is connected by a conduit passage 81 with the chamber 67.

The pump 64 pressures fuel through the jet 66 into the chamber 67 and the regulator jet 68 maintains the fuel under pressure in this chamber 67. The pressure of chamber 67 is transmitted through the passage 81 to each of the chambers 80. The pressure in the chambers 80 acts on the diaphragms 76 to open the throttle valves 71 but this action is resisted by the pressure in the chambers 73 on the other sides of the diaphragms. The pressure in each chamber 73 will change whenever the pressure drop across the branch metering jet 74 changes. Since each branch metering jet discharges into the same manifold passage 70 as the pilot regulating jet 68, which maintains pressure in the chamber 67, it is evident that any variation in the pressure drop across the pilot metering jet 66 will immediately be reflected in a pressure change in the chambers 80 thereby changing the setting of the throttle valve and maintaining a constant flow ratio in the passages 62 and 65. If the sizes of the metering orifices are equal, the flow rate in each passage will be identical as determined by the pump 64 and by a positive displacement fuel pump 82 receiving fuel from the manifold 70 and discharging into the carburetor 83 of an aircraft engine 84 for admixture with air from the air scoop 85 to form the fuel charge for the engine.

The system of Figure 3, therefore, operates in reverse relation relative to the systems of Figures 1 and 2.

Figure 4:
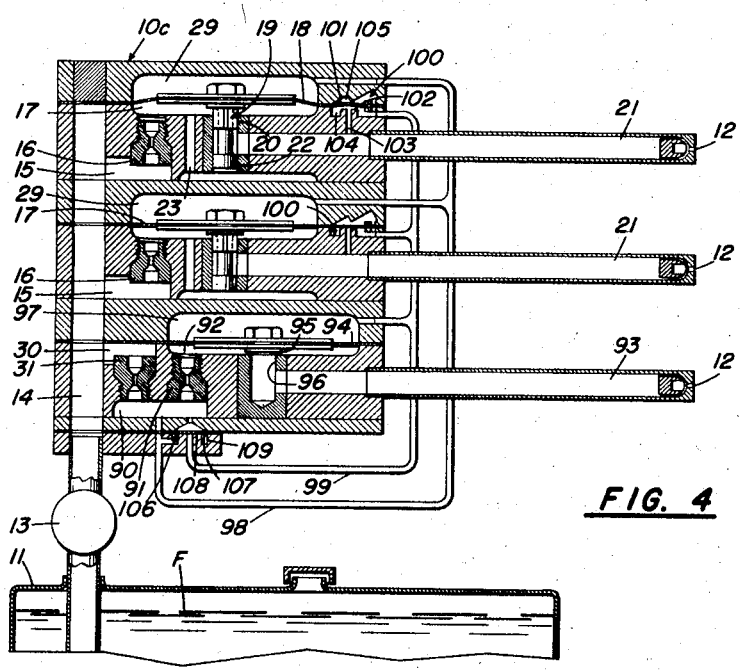
Figure 4 is a diagrammatic elevational view, with parts in vertical cross section, illustrating still another system for equally distributing fuel to a plurality of fixed orifice jets or nozzles which system has an increased operating range.

In the embodiment of Figure 4, the apparatus 10c distributes fuel F from the tank 11 to a plurality of fixed orifice nozzles 12 without circulating the fuel back to the tank, as in the embodiment of Figure 1. The manifold passage 14 of the apparatus 10c has the same branch passages 15, jets 16, chambers 17, limp diaphragms 18, throttle valves 19, orifices 20, passages 21, seats 22, and passages 23 as the apparatus 10 of Figure 1, together with chambers 29 above the diaphragms 18. The pilot branch passage 30 also extends from the manifold 14 and discharges through the pilot orifice 31 in the same manner as described in Figure 1, but a chamber 90 receives the fuel from the jet 31 and discharges through a jet 91 into a chamber 92 communicating through a passage 93 with one of the nozzles 12 and containing a limp diaphragm 94 carrying a shut-off valve 95 adapted to coact with a seat 96 in the entrance mouth to the passage 93. A chamber 97 is provided above the diaphragm 94.

The chamber 90 between the jets 31 and 91 is connected through a passaged conduit 98 with each of the chambers 29.

The chamber 97 is connected through a passaged conduit 99 with check valves 100 interposed between the passages 21 and the conduit 99. Each check valve 100 includes a limp diaphragm 101, which may be a part of the diaphragm 18, coacting with a seat 102 controlling flow through a passage 103 to the passage 21. The diaphragm 101 is exposed on one face to a chamber 104 and on the other face to a chamber 105, both of which are connected to the conduit 99. When pressure in the conduit 99 is greater than pressure in the passageway 21, the diaphragm will be forced downwardly against the seat 102 to close the passage 103 as shown in the lower valve 100 of Figure 4. When pressure in the passage 21 is greater than pressure in the conduit 99, the diaphragm 101 will be raised off of its seat 102 to the open position shown at the top of Figure 4. When the pressure in any of the passages 21 is greater than prevails at any given time in the conduit 99, the check valve 100 associated with such passage 21 will open and thereby effect communication with, and equalization of the pressure in, the conduit 99. At the same time the remaining check valves 100, associated with the passages 21 that are at a lower pressure are closed. By this arrangement, therefore, the pressure in the conduit 99 and therethrough in the pilot chamber 97 is at all times equal to the highest pressure in any passage 21. The diaphragm-operated shut-off valve 95 will be positioned by the diaphragm 94 to balance the pressure in chamber 92 with the pressure in chamber 97 and conduit 99. Any pressure adjustment thus effected will be reflected in the pilot chamber 90 and thence through the conduit 98 in the diaphragm balancing chamber 29 to effect corresponding adjustment of the respective throttle valve 19. Thereby the pressure drop across any throttle valve 19 will always be equal to or greater than the pressure drop across jet 91 so that the throttle valve 19 will not have to have an area greater than that of the jet 91.

The conduit 99 also communicates with another check valve 106 which is so arranged as to permit flow from the conduit 99 into the chamber 90 but to prevent flow from this chamber 90 into the conduit 99. Thus the check valve 106 has a diaphragm 107 coacting with a seat 108 on the discharge mouth of the conduit 99 and connected with a passage 109 communicating with the chamber 90 and conduit 98 to relieve the pressure in conduit 99 when the apparatus is not operating.

During operation of the apparatus 10c, the pressure in chamber 90 is normally higher than the pressure in the conduit 99 and the check valve 106 remains closed. If the pressure in passage 93 should be higher than that in any passage 21, the diaphragm-operated valve 95 will move to a wide open position. This valve 95 should preferably be arranged so that it offers very little restriction to flow when wide open thereby keeping the pressure drop across the distribution control to a minimum. If the pressure in the passage 93 drops materially, the diaphragm valve 95 will move to a closed position in accordance with the pressure in the chamber 97.

The device 10c of Figure 4 therefore functions like the device 10 of Figure 1 to divide the flow from the manifold 14 into a plurality of separate paths discharging through fixed orifices and flowing to the discharge nozzles under the control of diaphragm-actuated throttle valves which are automatically adjusted whenever the pressure drops across the orifices vary relative to each other. The throttling valves are under control of a pressure maintained between two fixed orifices by fuel flowing through still another branch passage to another nozzle. Flow to this other nozzle is under control of a diaphragm-operated valve which is automatically positioned to maintain the feed chamber to this nozzle equal to the pressure of the highest pressured nozzle passage. The arrangement of Figure 4 increases the operating range for the pump 13 since the pilot system can maintain the pressures in the chamber 90 above the pressures in the chamber 29, being augmented by the discharge pressures in the passages 21.

Figure 5:
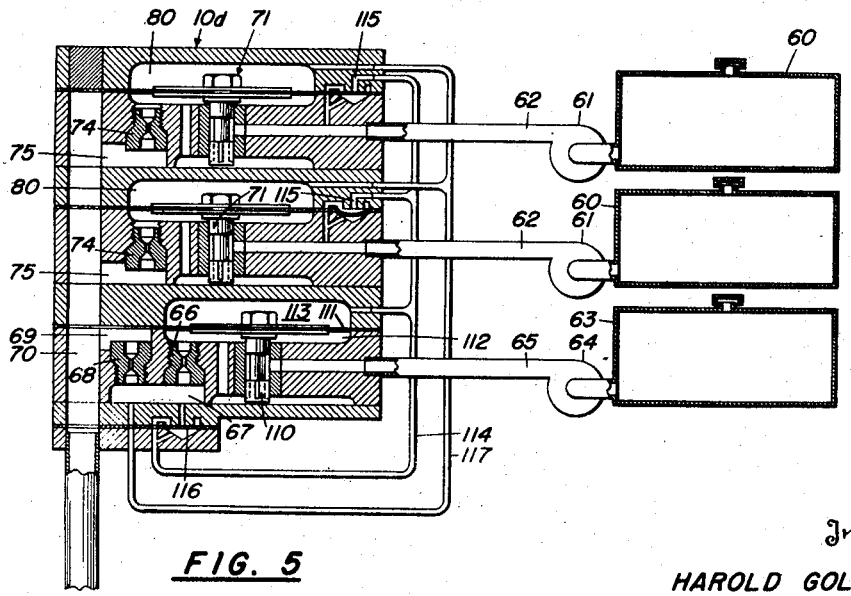

In the embodiment illustrated in Figure 5, parts identical with parts described in connection with Figure 3 have been marked with the same reference numerals. In Figure 5 the tanks 60 are emptied by the pumps 61 through the passages 62, discharging through the throttle valves 71 and orifices 74 into the manifold 70 under control of the flow rate through the pilot orifices 66 and 68 which maintain pressure in the pilot chamber 67 above the pressures in the diaphragm chambers 80. The pump 64 from the tank 63 flows fuel through the passage 65 and throttle valve 110 controlled by a diaphragm 111 between a chamber 112 exposed to the discharge from the throttle valve and a chamber 113. The chamber 113 is connected by conduit 114 to check valves 115 exposed to pressure in the passages 62 and operating so that the conduit 114 will always be subjected to the lowest pressure in any passage 62. Conduit 114 also communicates with a second check valve 116 exposed to pressure in the pilot chamber 67 and operating so that the conduit 114 will always at least be under the pressure of the chamber 67. This chamber 67 is also connected by a conduit 117 with each of the diaphragm chambers 80. The device 10d of Figure 5 operates in the same manner as the device 10a of Figure 2 with the added feature of being accurate under higher pressure conditions and therefore operative over a larger range since the pressure in the pilot chamber 67 is always augmented by the discharge pressures in the passages 62 and is under control of the diaphragm valve 110.

From the above descriptions it should be understood that the invention provides various forms of apparatus for automatically metering flow of fluid in separate paths to maintain a constant relationship in the volumetric flow along said paths throughout a wide range of flow rates. The invention includes methods of regulating flowing streams of fluid relative to each other whenever variations in pressure drops of the streams as they flow through separate orifices is encountered. The pilot control for the system and method preferably includes a series of orifices establishing therebetween a control pressure for throttling means in other streams. In some forms, the pilot control includes a closed circulation of fluid, in other forms the pilot fluid is not recirculated, and in still other forms the pressure built up between the series of orifices is augmented by incorporation of an added flow regulator in the fluid circuit.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. Apparatus for flowing liquid in predetermined flow ratio from a plurality of sources which comprises means defining a flow path for liquid from one source, said flow path having a series of orifices arranged to develop a pressure head therebetween, means providing separate flow paths for the liquid from all of the other of said plurality of sources, each of said other source flow paths having separate throttle valves and downstream therefrom separate orifices, means referencing said pressure head to said throttle valves to decrease the throttling effect upon an increase in said pressure head, and means effecting reference to the pressure of the liquid upstream from the orifices in said other paths and operative to resist the decrease in throttling effect of said throttle valves.

2. In apparatus for controlling the discharge rate of flowing liquid from each of a plurality of sources to a common receiver for the liquid, means defining a plurality of separate flow paths for the liquid from the sources, including a first path serving as a pilot, means variably throttling the liquid flow in said pilot path, means downstream from the throttling means in said pilot path providing a series of fixed orifices, means providing other respective flow paths for liquid from the remaining sources, variable throttling means in said other source paths, fixed orifices in said other source paths, means for combining the liquid from all of the paths, means referencing the pressure of the fluid in said pilot path between said series of fixed orifices in said other source paths, and means for referencing each of said other source flow paths to said throttle means in said pilot path.

3. In apparatus for controlling the discharge rate of flowing liquid from each of a plurality of sources to a common receiver for the liquid, means defining a plurality of separate flow paths for the liquid from the sources, including a first path serving as a pilot, means variably throttling the liquid flow in said pilot path, means downstream from the throttling means in said pilot path providing a series of fixed orifices, means providing other respective flow paths for liquid from the remaining sources, variable throttling means in said other source paths, fixed orifices in said other source paths, means for combining the liquid from all of the paths, means referencing the pressure of the fluid in said pilot path between said series of fixed orifices in said other source paths, means for referencing each of said other source flow paths to said throttle means in said pilot path, and means for referencing the pressure head between said series of fixed orifices to the throttle means in said pilot path whenever the pressures in said other source paths fall below said pressure head.

References Cited in the file of this patent

FOREIGN PATENTS

| 480,086 | Germany | July 27, 1929 |
| 577,132 | Great Britain | May 7, 1946 |